US006308568B1

(12) United States Patent
Moriya (10) Patent No.: US 6,308,568 B1
(45) Date of Patent: Oct. 30, 2001

(54) ANGULAR VELOCITY SENSOR

(75) Inventor: Kazufumi Moriya, Yokohama (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/410,290

(22) Filed: Sep. 30, 1999

(30) Foreign Application Priority Data

Oct. 1, 1998 (JP) ................................................. 10-280153

(51) Int. Cl.⁷ ................................................. G01C 19/00
(52) U.S. Cl. ............................................................ 73/504.13
(58) Field of Search ........................... 73/504.02, 504.12, 73/504.13

(56) References Cited

U.S. PATENT DOCUMENTS

| 5,220,835 | 6/1993 | Stephan . | |
|---|---|---|---|
| 5,226,321 | * 7/1993 | Uarnham et al. | 73/514.02 |
| 5,359,893 | 11/1994 | Dunn . | |

FOREIGN PATENT DOCUMENTS

| 9524652 | 9/1995 | (DE) . |
|---|---|---|
| 9815799 | 4/1998 | (DE) . |
| 9817973 | 4/1998 | (DE) . |

* cited by examiner

*Primary Examiner*—Richard A. Moller
(74) *Attorney, Agent, or Firm*—Ostrolenk, Faber, Gerb & Soffen, LLP (57) ABSTRACT

An angular velocity sensor including a framelike vibrator supported on a fixed support portion via a pair of beams. The framelike vibrator is placed into an inertial state by being vibrated by a driving means, and a displacement of the framelike vibrator due to Coriolis force is detected. The fixed support portion is formed on a support substrate made of a material having a different coefficient of thermal expansion in the center of the framelike vibrator, and the beams are T-shaped and include a first beam portion for displacing the framelike vibrator by the driving means in the driving direction, and a second beam portion for displacing the framelike vibrator in the direction of generation of the Coriolis force.

18 Claims, 4 Drawing Sheets

ANGULAR VELOCITY SENSOR

BACKGROUND OF THE INVENTION

1. Field of the Invention

The present invention relates to an angular velocity sensor for use in a car navigation system, a camera shaking prevention device, a robot attitude control device, and the like.

2. Description of the Related Art

Figure 7:
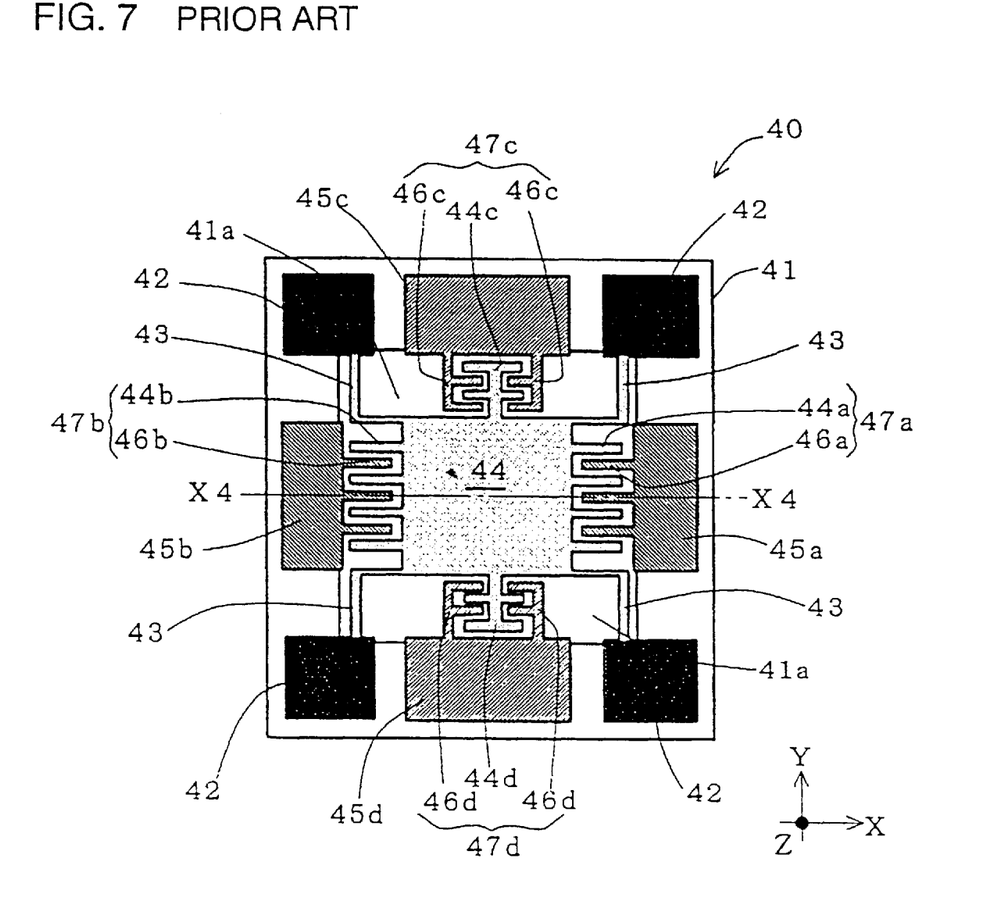
FIG. 7 is a plan view of a conventional angular velocity sensor.
Figure 8:
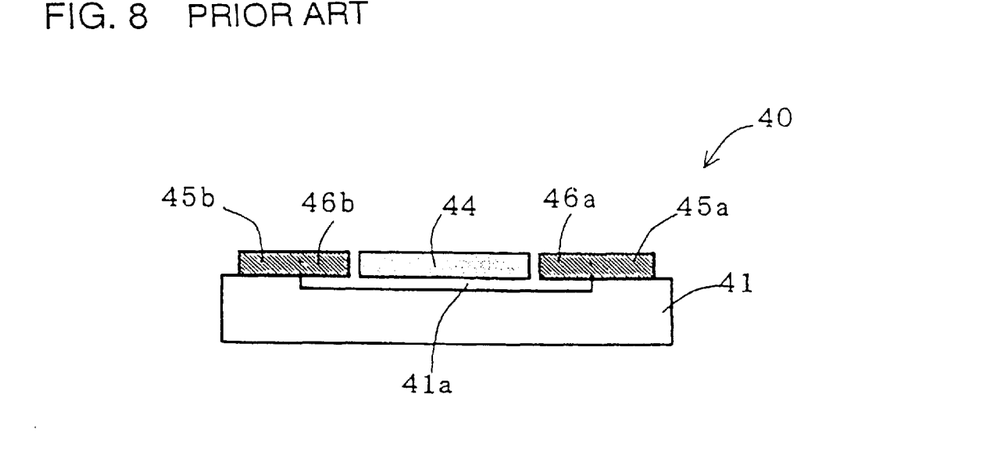
FIG. 8 is a cross-sectional view taken along line X4—X4 of FIG. 7.

A conventional angular velocity sensor 40 will be described below with reference to FIGS. 7 and 8. Four anchor portions 42 are formed at the four corners of a support substrate 41 made of Pyrex glass. L-shaped beams 43 are connected at one end to the anchor portions 42 and are connected at the other end to the four corners of a vibration weight 44, respectively. The vibration weight 44 serves as the load mass of the angular velocity sensor 40, and is allowed by the bending of the beams 43 to freely vibrate in the XY plane.

Comb-shaped movable electrodes 44a and 44b are formed on end faces (in the X-axis direction) of the vibration weight 44, and movable electrodes 44c and 44d shaped like the character are formed on the other end faces (in the Y-axis direction).

Fixed portions 45a to 45d are formed on the support substrate 41 between the adjoining anchor portions 42, respectively. A comb-shaped fixed electrode 46a formed on the inner side face of the fixed portion 45a is meshed with space therebetween with the movable electrode 44a to constitute a condenser 47a. A comb-shaped fixed electrode 46b formed on the inner side face of the fixed portion 45b is meshed with space therebetween with the movable electrode 44b to constitute a condenser 47b. Two F-shaped fixed electrodes 46c formed on the inner side face of the fixed portion 45c are meshed with space therebetween with the movable electrode 44c to constitute a condenser 47c. Furthermore, two F-shaped fixed electrodes 46d formed on the inner side face of the fixed portion 45d are meshed with space therebetween with the movable electrode 44d to constitute a condenser 47d.

A space 41a is formed under the beams 43, the vibration weight 44, the movable electrodes 44a to 44d, and the fixed electrodes 46a to 46d. In the angular velocity sensor 40, the elements, such as the anchor portions 42 and the vibration weight 44, excluding the support substrate 41, are formed by working a silicon substrate. The four anchor portions 42 and the fixed portions 45a to 45d, which are made of silicon, are joined onto the support substrate 41 of Pyrex glass by anode coupling.

Next, a description will be given of the operation of the angular velocity sensor 40. Since the angular velocity sensor 40 is operated with the anchor portions 42 connected to ground, the vibration weight 44 and the movable electrodes 44a to 44d are at ground potential.

The vibration weight 44 is vibrated by electrostatic attractive force in the X-axis direction by applying AC voltages having a phase difference of 180°, which are obtained by superimposing DC voltages, to the condenser 47a (between the anchor portion 42 and the fixed portion 45a) and the condenser 47b (between the anchor portion 42 and the fixed portion 45b). When the angular velocity sensor 40 rotates about the Z-axis passing through the center of the vibration weight 44 while the vibration weight 44 is thus vibrating, the vibration weight 44 receives a Coriolis force generated by the rotating force, and also vibrates in the Y-axis direction.

The vibration components in the Yaxis direction are detected as capacitance changes by the condensers 47c and 47d, and these capacitance changes are converted into voltages and are differentially amplified, thereby determining the angular velocity.

In the conventional angular velocity sensor 40, the four anchor portions 42 made of a silicon material are joined to the four separate corners of the support substrate 41 made of a Pyrex glass material. The vibration weight 44 similarly made of a silicon material is supported integrally with the anchor portions 42 via the four beams 43.

Therefore, the difference in coefficient of thermal expansion between the support substrate 41 of Pyrex glass and the anchor portions 42 of silicon causes the joint portions therebetween to be warped. Because of this warp, the beams 43 connected to the vibration weight 44 receive compressive stress or tensile stress. The compressive stress and tensile stress become residual stress, which changes the vibration frequency of the vibration weight, and has an adverse effect on sensitivity of detection based on Coriolis force and the temperature characteristics of the mechanical resonant frequency of the vibration weight. For this reason, the detection sensitivity and the mechanical resonant frequency of the angular velocity sensor change substantially due to changes in temperature.

SUMMARY OF THE INVENTION

The present invention can solve the aforementioned problem associated with the conventional art and provides an angular velocity sensor with improved detection sensitivity and temperature characteristics of the mechanical resonant frequency.

The angular velocity sensor comprises a framelike vibrator supported on a support portion via a pair of T-shaped beams, the support portion being disposed in the center of the framelike vibrator and being formed on a support substrate made of a material having a different coefficient of thermal expansion than the support portion. The T-shaped beams include a first beam portion structured and arranged for displacing the framelike vibrator in a first driving direction, and a second beam portion structured and arranged for displacing the framelike vibrator in a second direction orthogonal to the first direction in response to Coriolis force when the support portion is rotated about an axis extending in a third direction orthogonal to the first and second directions.

According to the present invention, even when the fixed support portion and the support substrate are made of different materials and are different in coefficient of thermal expansion, since the framelike vibrator is supported by the single fixed support portion via the beams, tensile stress or compressive stress resulting from the difference in coefficient of thermal expansion is concentrated on the fixed support portion or is reduced, whereby residual stress on the beams decreases. Therefore, it is possible to prevent sensitivity of detection based on Coriolis force and the temperature characteristics of the mechanical resonant frequency of the vibration weight from being deteriorated due to the residual stress.

Furthermore, temperature changes do not have a serious influence on the framelike vibrator because of the action of the pair of T-shaped beams composed of the first beam portion and the second beam portion that are placed orthogonal to each other.

According to another aspect of the present invention, the angular velocity sensor comprises an inner framelike vibrator supported on a fixed support portion via a pair of inner beams and an outer framelike vibrator supported outside the inner framelike vibrator via at least a pair of outer beams. The fixed support portion is disposed in the center of the inner framelike vibrator and is formed on a support substrate made of a material having a different coefficient of thermal expansion in the center of the inner framelike vibrator than the support portion. The inner beams are structured and arranged to displace the inner framelike vibrator and the outer framelike vibrator in a first driving direction and the outer beams are structured and arranged to displace the outer framelike vibrator in a second direction orthogonal to the first direction in response to a Coriolis force when the support portion is rotated about an axis extending in a third direction orthogonal to the first and the second directions.

According to this angular velocity sensor, the action of stress that the fixed support portion receives from the support substrate is similar to that first angular velocity sensor. That is, since the initial stress and stress resulting from temperature changes of the fixed support portion are reduced, the stress of the fixed support portion has little effect on the inner beams, the inner framelike vibrator, the outer beams, and the outer framelike vibrator.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

An angular velocity sensor according to an preferred embodiment of the present invention comprises a framelike vibrator supported on a fixed support portion via a pair of beams. The framelike vibrator is placed into an inertial state by being vibrated by a driving means, and a displacement of the framelike vibrator due to Coriolis force is detected. The fixed support portion is formed on a support substrate made of a material having a different coefficient of thermal expansion in the center of the framelike vibrator, and the beams are T-shaped and include a first beam portion for displacing the framelike vibrator by the driving means in the driving direction, and a second beam portion for displacing the framelike vibrator in the direction of generation of the Coriolis force.

In this invention, the framelike vibrator is supported, at its center, on the support substrate, by a single fixed support portion, via a pair of T-shaped beams. The fixed support portion is joined or bonded to the support substrate made of a different material at one point in a heated atmosphere. Because of this joint or bonding in the presence of heat, when the temperature returns to normal temperature, tensile stress or compressive stress arises in the fixed support portion. These stresses possess temperature characteristics, and change, increase or decrease, with temperature. Since the fixed support portion is fixed on the support substrate at one point in the minimum area and in isolation, however, the stress (distortion), which the fixed support portion receives from the support substrate due to the temperature change, is not unevenly distributed, but is reduced. In this way, even when there is a difference in temperature coefficient between the support substrate and the fixed support portion, since the fixed support portion receives only a small stress from the support substrate, a pair of beams connected to the support substrate also receive a small stress from the initial stress and the stress varying with temperature of the support substrate. Therefore, the influence of the stress to be applied to the framelike vibrator via the pair of beams is reduced. Accordingly, it is possible to prevent sensitivity of detection based on Coriolis force and the temperature characteristics of the mechanical resonant frequency characteristics from being deteriorated due to residual stress and temperature changes of the fixed support portion.

Furthermore, since the first beam portion connected to the support fixed portion and the second beam portion connected to the framelike vibrator are arranged orthogonal to each other in the pair of T-shaped beams, the second beam portion is not bent by the force acting from the direction of one of the intersecting axes, e.g., the driving force, whereas the first beam portion is bent to vibrate the framelike vibrator in the driving direction. In contrast, the first beam portion is not bent by the force acting from the direction of the other intersecting axis, e.g., Coriolis force, whereas the second beam portion is bent to displace the framelike vibrator in the direction of the Coriolis force. The difference in bending direction between the first beam portion and the second beam portion of the pair of T-shaped beams allows planar motion of the framelike vibrator.

According to another preferred embodiment of the present invention, an inner framelike vibrator is supported on a fixed support portion via a pair of inner beams, an outer framelike vibrator is supported outside the inner framelike vibrator via at least a pair of outer beams. The inner framelike vibrator and the outer framelike vibrator are placed into an inertial state by being vibrated by a driving means in a fixed direction, and the displacement of the outer framelike vibrator based on Coriolis force is detected. The fixed support portion is formed on a support substrate made of a material having a different coefficient of thermal expansion in the center of the inner framelike vibrator. The inner beams displace the inner framelike vibrator and the outer framelike vibrator in the direction of driving by the driving means, and the outer beams displace the outer framelike vibrator in the direction of generation of the Coriolis force.

According to the structure, the fixed support portion is joined or bonded to the support substrate made of a different material at one point. The stress that the fixed support portion receives from the support substrate acts in a manner similar to that according to the first preferred embodiment. That is, since the initial stress and the stress varying with temperature of the support substrate are reduced, the stress acting on the inner beams is small, and the stress imposed on the inner framelike vibrator connected to the inner beams also has little influence. Similarly, the stress that the outer framelike vibrator receives has little influence.

The inner beam and the outer beam are arranged orthogonal to each other, correspond to the first beam portion and the second beam portion according to the first preferred embodiment, respectively, and serve almost similar functions. That is, while the outer beams are not bent by the force acting from the direction of one of the intersecting axes, e.g., driving force, the pair of inner beams are bent to vibrate the inner framelike vibrator and the outer framelike vibrator together in the driving direction. In contrast, while the inner beams are not bent by the force acting from the direction of the other intersecting axes, e.g., Coriolis force, the outer beams are bent to vibrate only the outer framelike vibrator in the direction of the Coriolis force without displacing the inner framelike vibrator. The bending of the inner beams and the outer beams in different directions allows planar motion of the outer framelike vibrator.

Hereinafter, the preferred embodiments of the present invention are explained in more detail with reference to the drawings.

Figure 1:
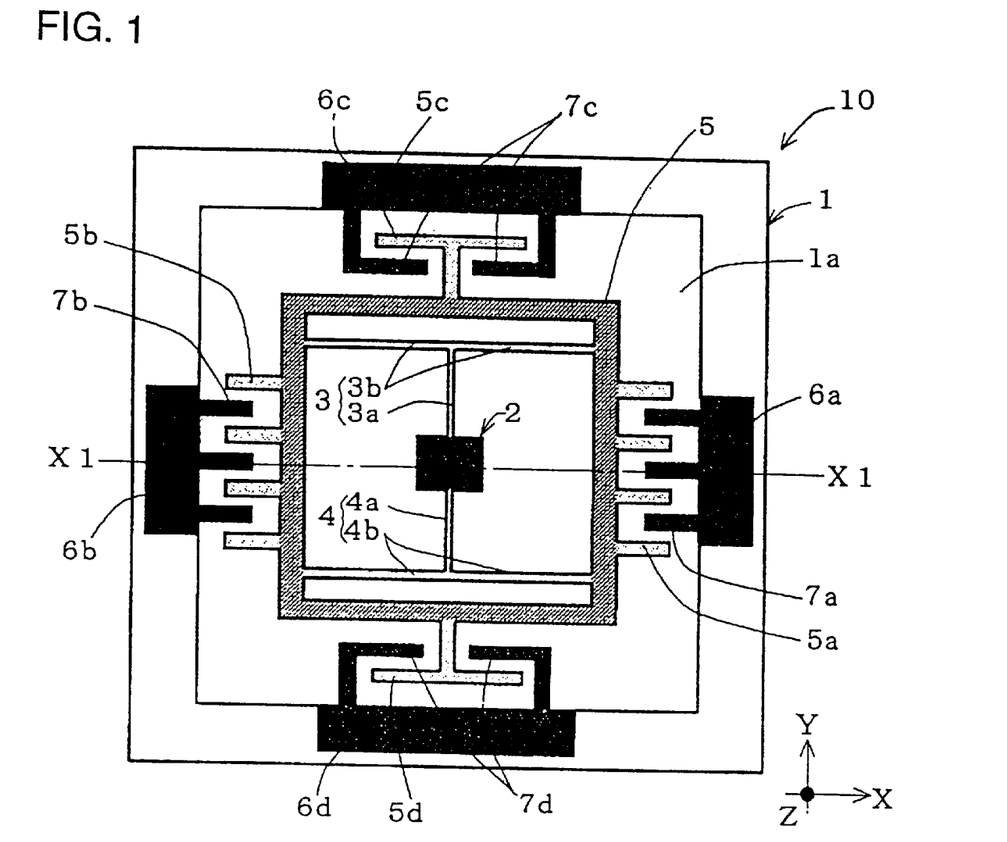
FIG. 1 is a plan view of an angular velocity sensor according to a first embodiment of the present invention.
Figure 2:
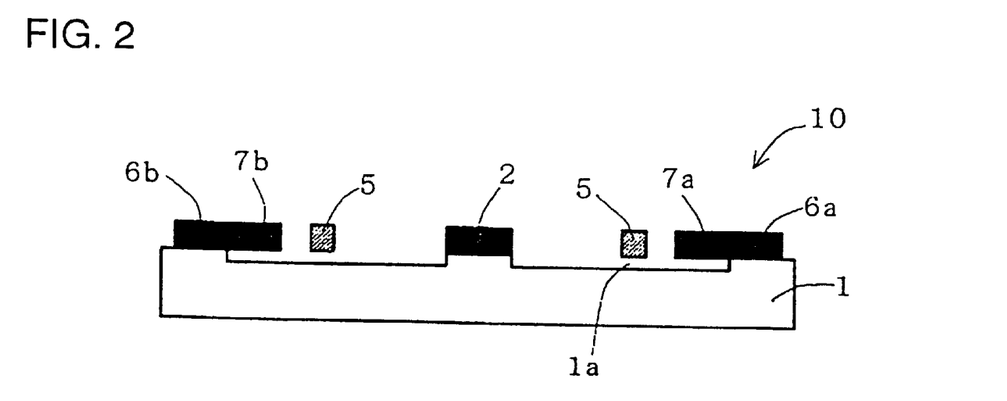
FIG. 2 is a cross-sectional view taken along line X1—X1 of FIG. 1.

An angular velocity sensor 1 according to the first preferred embodiment of the present invention will be described below with reference to FIGS. 1 and 2. Numeral 1 denotes a support substrate that is formed by working a Pyrex glass substrate. On the upper surface of the support substrate 1, excluding the peripheral and center portions, a recessed portion 1a is formed to provide a free vibration space for movable sections, such as a framelike vibrator, which will be described later. Numeral 2 denotes a fixed support portion that is formed by working a silicon substrate, and that is formed on a projection at the center of the support substrate 1. From both side faces of the fixed support portion 2 in the Y-axis direction, first beam portions 3a and 4a extend in opposite directions along a straight line, namely, the Y-axis, and the leading ends thereof are perpendicularly connected to the centers of second beam portions 3b and 4b, respectively. Both ends of the second beam portions 3b and 4b are perpendicularly connected to the opposing inner side faces of a framelike vibrator 5, respectively. The first beam portion 3a and the second beam portion 3b constitute a T-shaped beam 3, and the first beam portion 4a and the second beam portion 4b constitute a T-shaped beam 4. The framelike vibrator 5 is supported by the fixed support portion 2 via the pair of T-shaped beams 3 and 4 so that it is capable of planar motion.

Comb-shaped movable electrodes 5a and 5b are formed on both outer side faces of the framelike vibrator 5 in the extending direction of the second beam portions 3b and 4b (in the X-axis direction), respectively. T-shaped movable electrodes 5c and 5d are formed on both outer side faces in the extending direction of the first beam portions 3a and 4a (in the Y-axis direction), respectively.

On the projecting peripheral portion of the support substrate 1, fixed portions 6a and 6b are formed at the positions facing the vibration electrodes 5a and 5b, and fixed portions 6c and 6d are formed at the positions facing the movable electrodes 5c and 5d, respectively. A comb-shaped fixed electrode 7a is formed on the inner side face of the fixed portion 6a so as to be meshed with space therebetween with the movable electrode 5a. A comb-shaped fixed electrode 7b is formed on the inner side face of the fixed portion 6b so as to be meshed with space therebetween with the movable electrode 5b. Two L-shaped fixed electrodes 7c are formed on the inner side face of the fixed portion 6c so as to adjoin the movable electrode 5c with space therebetween. Furthermore, two L-shaped fixed electrodes 7d are formed on the inner side face of the fixed portion 6d so as to adjoin the movable electrode 5d with space therebetween.

Movable sections including the pair of T-shaped beams 3 and 4, the framelike vibrator 5, and the movable electrodes 5a to 5d are formed integrally with the fixed support portion 2 by working a silicon substrate. The fixed portions 6a to 6d and the fixed electrodes 7a to 7d are also formed by working the same silicon substrate as the silicon substrate of which the fixed support portion 2 and the like are formed.

Next, a description will be given of the operation of the angular velocity sensor 10. AC voltages having a phase difference of 180° are applied between the movable electrode 5a and the fixed electrode 7a, and between the movable electrode 5b and the fixed electrode 7b, at the frequency that coincides with the mechanical resonant frequency of the movable sections including the framelike vibrator 5. Then, the framelike vibrator 5 is vibrated in the X-axis direction by the bending of the first beam portions 3a and 4a of the pair of T-shaped beams 3 and 4 (in this case, the second beam portions 3b and 4b are not bent). When the angular velocity sensor 10 rotates about the Z-axis passing through the center of the fixed support portion 2 while the framelike vibrator 5 is thus vibrating in an inertial state, the framelike vibrator 5 also vibrates in the Y-axis direction because of Coriolis force. The vibrations in the Y-axis direction are made possible by bending of the second beam portions 3b and 4b of the pair of T-shaped beams 3 and 4. The capacitance produced between the fixed electrodes 7c and the movable electrode 5c and the capacitance produced between the fixed electrodes 7d and the movable electrode 5d change so that one of them increases and the other decreases. By subjecting these variable capacitances into conversion into voltages and differential amplification, the rotation angular velocity can be found.

Figure 3:
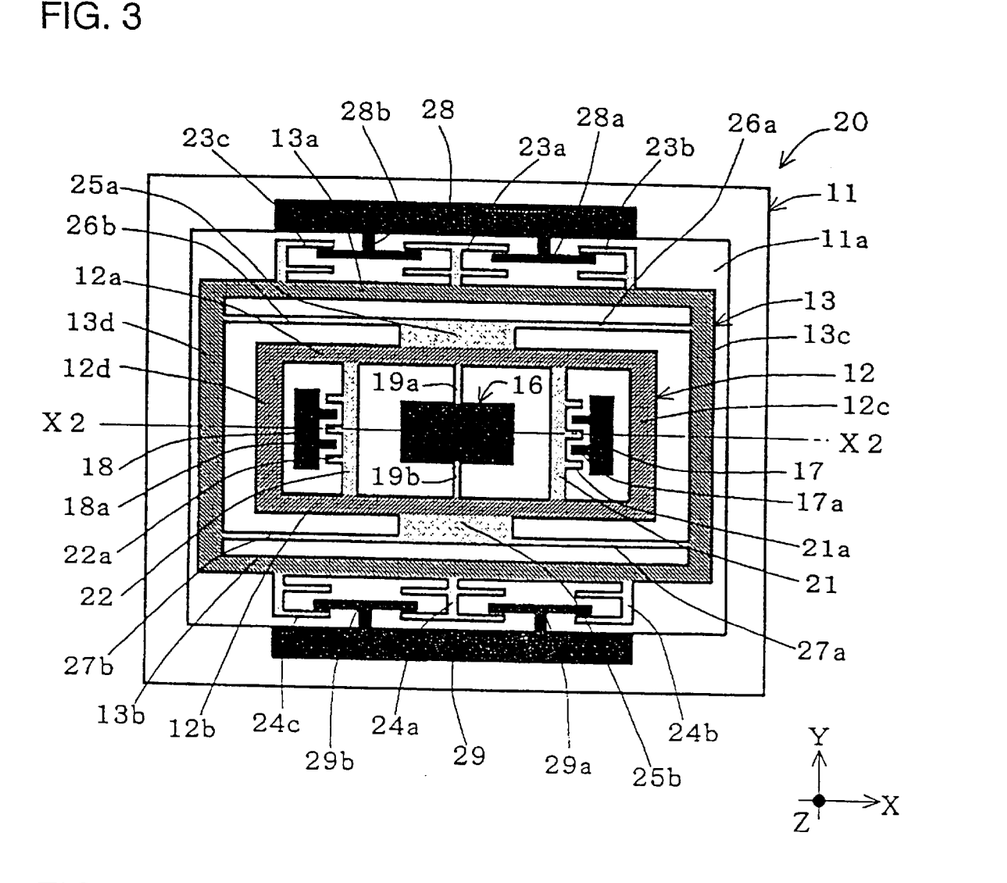
FIG. 3 is a plan view of an angular velocity sensor according to a second embodiment of the present invention.
Figure 4:
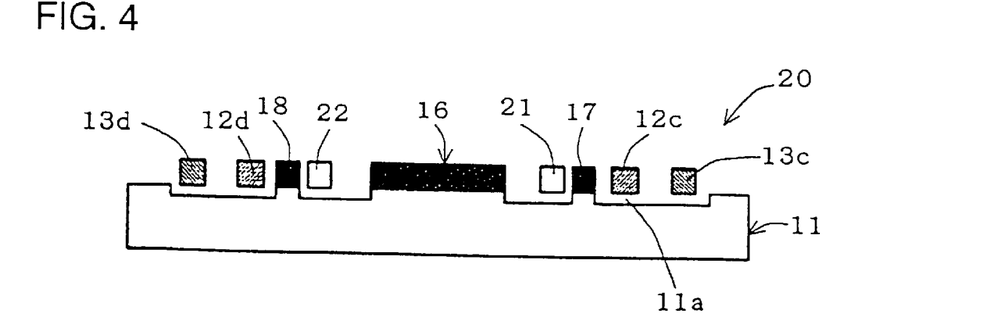
FIG. 4 is a cross-sectional view taken along line X2—X2 of FIG. 3.

Next, an angular velocity sensor 20 according to a second embodiment of the present invention will be described with reference to FIGS. 3 and 4. Numeral 11 denotes a support substrate formed by working a Pyrex glass substrate, on which, excluding the peripheral portion and three center portions, a recessed portion 11a is formed to provide a free vibration space for movable sections including an inner framelike vibrator 12, an outer framelike vibrator 13, and the like.

The inner framelike vibrator 12 is shaped like a rectangular frame composed of long bars 12a and 12b and short bars 12c and 12d. Inside the frame, a fixed support portion 16 and two fixed drive portions 17 and 18 are disposed. A pair of inner beams 19a and 19b are perpendicularly connected at one end to both side faces in the Y-axis direction of the fixed support portion 16 that is disposed at a projection in the center of the support substrate 11, and are perpendicularly connected at the other end to the centers of the opposing inner side faces of the long bars 12a and 12b of the inner framelike vibrator 12. The pair of inner beams 19a and 19b are placed in parallel with the short bars 12c and 12d along a straight line (Y-axis). The inner framelike vibrator 12 is supported via the pair of inner beams 19a and 19b so that it can vibrate in the X-axis direction.

Driving poles 21 and 22 are connected to the inner side faces of the long bars 12a and 12b between the pair of inner beams 19a and 19b and the short bars 12c and 12d. On the outer side faces of the driving poles 21 and 22, movable comb electrodes 21a and 22a are formed, respectively. The movable comb electrodes 21a and 22a are meshed with space therebetween with fixed comb electrodes 17a and 18a formed in the fixed drive portions 17 and 18. The fixed drive portions 17 and 18 are formed on projections apart from the center of the support substrate 11.

The outer framelike vibrator 13 is approximately similar in shape to the inner framelike vibrator 12, and is composed of long bars 13a and 13b and short bars 13c and 13d. Connecting portions 25a and 25b are provided at the centers of the outer side faces of the long bars 12a and 12b of the inner framelike vibrator 12, respectively. Two pairs of outer beams 26a and 26b, and 27a and 27b are connected at one end to the leading corners of the connecting portions 25a and 25b, and are connected at the other end to the short bars 13c and 13d in parallel with the long bars 13a and 13b.

H-shaped movable comb electrodes 23a and 24a are formed at the centers of the outer side faces of the long bars 13a and 13b of the outer framelike vibrator 13, and F-shaped movable comb electrodes 23b and 23c, and 24b and 24c, are formed on both sides thereof.

Furthermore, fixed detecting portions 28 and 29 are formed on the peripheral projecting portion in the Y-axis direction of the support substrate 11. T-shaped fixed electrodes 28a and 28b, and 29a and 29b are connected to the inner side faces of the fixed detecting portions 28 and 29, respectively, and are meshed with space therebetween with the H-shaped and F-shaped movable comb electrodes 23a to 23c and 24a to 24c.

The solid filled portions of the angular velocity sensor 20, such as the fixed support portion 16, represent fixed sections, and the lightly filled portions, such as the inner framelike vibrator 12 and the outer framelike vibrator 13, represent movable sections having an integral combined structure. The movable sections and the fixed sections are formed by working a silicon substrate. The movable sections are movably supported via the pair of inner beams 19a and 19b by the fixed support portion 16, connected to the support substrate 11, at the center of the inner framelike vibrator (outer framelike vibrator). Moreover, the inner framelike vibrator and the outer framelike vibrator are supported via the two pairs of outer beams 26a and 26b, and 27a and 27b, so that they can be displaced relative to each other.

Next, the operation of the angular velocity sensor 20 will be described. AC voltages having a phase difference of 180°, which are obtained by superimposing DC voltages, are applied between the fixed comb electrode 17a and the movable comb electrode 21a, and between the fixed comb electrode 18a and the movable comb electrode 22a. Then, the inner framelike vibrator 12 and the outer framelike vibrator 13 are vibrated in the X-axis direction due to bending of the pair of inner beams 19a and 19b (the two pairs of outer beams 26a and 26b, and 27a and 27b, are not bent). When the angular velocity sensor 20 rotates about the Z-axis passing through the center of the fixed support portion 16 while the inner framelike vibrator 12 and the outer framelike vibrator 13 are thus vibrating in an inertial state, Coriolis force in the Y-axis direction acts on the inner framelike vibrator 12 and the outer framelike vibrator 13. The inner framelike vibrator 12 is not able to be displaced in the Y-axis direction, and only the outer framelike vibrator 13 vibrates in the Y-axis direction because of bending of the two pairs of outer beams 26a and 26b, and 27a and 27b. One of the capacitances generated between the movable comb electrodes 23a to 23c and the fixed comb electrodes 28a and 28b, and between the movable comb electrodes 24a to 24c and the fixed comb electrodes 29a and 29b increases, whereas the other decreases. The rotation angular velocity is found by subjecting these increasing and decreasing capacitances to conversion into voltages and differential amplification.

Figure 5:
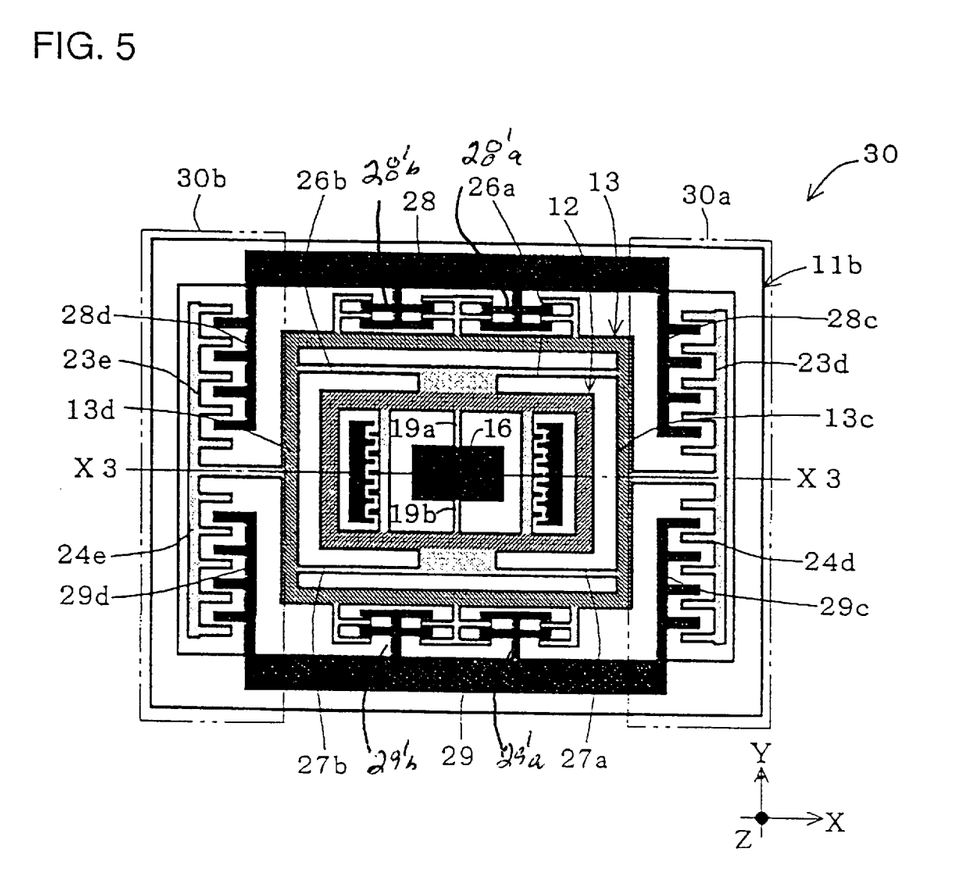
FIG. 5 is a plan view of an angular velocity sensor according to a third embodiment of the present invention.
Figure 6:
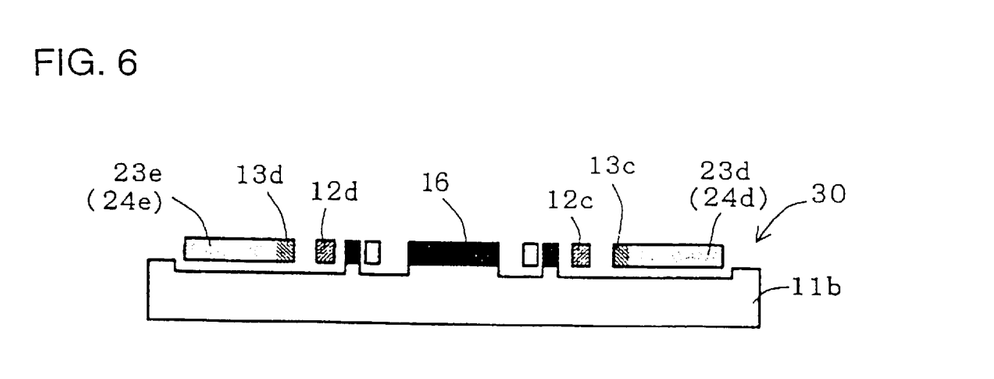
FIG. 6 is a cross-sectional view taken along line X3—X3 of FIG. 5.

Next, an angular velocity sensor 30 according to a third embodiment of the present invention will be described with reference to FIGS. 5 and,6. In this angular velocity sensor 30, the single T-shaped fixed comb electrodes 28a, 28b, 29a, and 29b in the angular velocity sensor 20 are changed to be double T-shaped and designated 28'a, 28'b, 29'a and 29'b, respectively, and the number of comb electrodes, such as the movable comb electrodes 21a and 22a and the fixed comb electrodes 17a and 18a, is increased, and in particular, portions 30a and 30b shown by two dot chain lines are added. Since other constituents are approximately similar to those of the angular velocity sensor 20, they are denoted by the same numerals, and a description thereof is omitted.

Both ends of fixed detecting portions 28 and 29 are extended in the X-axis direction, and fixed comb electrodes 28c and 28d, and 29c and 29d, which are bent inward in the Y-axis direction, are provided at the leading ends thereof. The centers of short bars 13c and 13d of an outer framelike vibrator 13 are extended outward in the X-axis direction, and movable comb electrodes 23d and 23e and movable comb electrodes 24d and 24e are provided at the leading ends thereof so as to extend in both Y-axis directions and to be meshed with space therebetween with the fixed comb electrodes 28c and 28d and the fixed comb electrodes 29c and 29d. By adding the fixed comb electrodes and the movable comb electrodes in this way, it is possible to improve sensitivity in detecting the angular velocity based on Coriolis force. The operation of the angular velocity sensor 30 of this embodiment is similar to that of the angular velocity sensor 20 and, accordingly, a description thereof is omitted.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor, comprising a framelike vibrator supported on a support portion via a pair of T-shaped beams, said support portion being disposed in the center of said framelike vibrator and being formed on a support substrate made of a material having a different coefficient of thermal expansion than said support portion, said T-shaped beams including a first beam portion structured and arranged for displacing said framelike vibrator in a first driving direction, and a second beam portion structured and arranged for displacing said framelike vibrator in a second direction orthogonal to said first direction in response to a Coriolis force when said support portion is rotated about an axis extending in a third direction orthogonal to said first and said second directions.

2. An angular velocity sensor according to claim 1, further comprising driving means for causing said framelike vibrator to be displaced in said first direction and detection means for detecting displacement of the framelike vibrator in said second direction.

3. An angular velocity sensor according to claim 2, wherein said driving means comprises a first plurality of movable driving electrodes disposed on a first portion of said framelike vibrator and a first plurality of fixed driving electrodes disposed on a first portion of said support substrate, said first plurality of movable driving electrodes being arranged with respect to said first plurality of fixed driving electrodes such that when a voltage is applied between said first plurality of movable driving electrodes and said first plurality of fixed driving electrodes, a driving force is applied to said framelike vibrator to cause displacement thereof in the first direction.

4. An angular velocity sensor according to claim 3, comprising a second plurality of movable driving electrodes disposed on a second portion of said framelike vibrator spaced from and opposite to said first portion thereof and a second plurality of fixed driving electrodes disposed on a second portion of said support substrate spaced from and opposite to said first portion thereof, said second plurality of movable driving electrodes being arranged with respect to said second plurality of fixed driving electrodes such that when said voltage is applied between said second plurality of movable driving electrodes and said second plurality of fixed driving electrodes, a driving force is applied to said framelike vibrator to cause displacement thereof in the second direction.

5. An angular velocity sensor according to claim 4, wherein said first and second portions of said framelike vibrator and said first and second portions of said support substrate are each orthogonal to said first direction, and wherein each of said movable driving electrodes of said first and second plurality of movable driving electrodes and each of said fixed driving electrodes of said first and second plurality of fixed driving electrodes extend in said first direction.

6. An angular velocity sensor according to claim 2, wherein said detection means comprises at least one first movable detection electrode on a third portion of said framelike vibrator orthogonal to said first and first portions and a first plurality of fixed detection electrodes disposed on a third portion of said support substrate orthogonal to first and second portions of said support substrate, said first movable detection electrode and said second plurality of fixed detection electrodes being arranged with respect to each other to form a first detection condenser.

7. An angular velocity sensor according to claim 6, wherein said detection means comprises at least one second movable detection electrode on a fourth portion of said framelike vibrator spaced from and opposite to said third portion and a second plurality of fixed detection electrodes disposed on a fourth portion of said support substrate spaced from and opposite to said third portion of said support substrate, said second movable detection electrode and said second plurality of fixed detection electrodes being arranged with respect to each other to form a second detection condenser.

8. An angular velocity sensor according to claim 7, wherein each of said first and second pluralities of fixed electrodes has a comb-like configuration and each of said first and second pluralities of movable electrodes has a comb-like configuration.

9. An angular velocity sensor according to claim 8, wherein each of said first movable detection electrodes and said second movable detection electrodes is T-shaped.

10. An angular velocity sensor, comprising an inner framelike vibrator supported on a support portion via a pair of inner beams, an outer framelike vibrator supported outside said inner framelike vibrator via at least a pair of outer beams, said support portion being disposed in the center of said inner framelike vibrator and being formed on a support substrate made of a material having a different coefficient of thermal expansion in the center of said inner framelike vibrator than said support portion, said inner beams being structured and arranged to displace said inner framelike vibrator and said outer framelike vibrator in a first driving direction, and said outer beams being structured and arranged to displace said outer framelike vibrator in a second direction orthogonal to said first direction in response to a Coriolis force when said support portion is rotated about an axis extending in a third direction orthogonal to said first and said second directions.

11. An angular velocity sensor according to claim 10, further comprising driving means for causing said inner and outer framelike vibrators to be displaced in said first direction and detection means for detecting displacement of said outer framelike vibrator in said second direction.

12. An angular velocity sensor according to claim 11, wherein said driving means comprises a first plurality of movable driving electrodes disposed on a first portion of said inner framelike vibrator and a first plurality of fixed driving electrodes disposed on a first portion of said support substrate, said first plurality of movable driving electrodes being arranged with respect to said first plurality of fixed driving electrodes such that when a voltage is applied between said first plurality of movable driving electrodes and said first plurality of fixed driving electrodes, a driving force is applied to said inner framelike vibrator to cause displacement thereof in the first direction.

13. An angular velocity sensor according to claim 12, comprising a second plurality of movable driving electrodes disposed on a second portion of said inner framelike vibrator spaced from and opposite to said first portion and a second plurality of fixed driving electrodes disposed on a second portion of said support substrate spaced from and opposite to said first portion thereof, said second plurality of movable driving electrodes being arranged with respect to said second plurality of fixed driving electrodes such that when said voltage is applied between said second plurality of movable driving electrodes and said second plurality of fixed driving electrodes, a driving force is applied to said inner framelike vibrator to cause displacement thereof in the second direction.

14. An angular velocity sensor according to claim 13, wherein said first and second portions of said inner framelike vibrator and said first and second portions of said support substrate are each orthogonal to said first direction, and wherein each of said movable driving electrodes of said first and second plurality of movable driving electrodes and each of said fixed driving electrodes of said first and second plurality of fixed driving electrodes extend in said first direction.

15. An angular velocity sensor according to claim 14, wherein said detection means comprises at least one first movable detection electrode on a third portion of said inner framelike vibrator orthogonal to said first and second portions and a first plurality of fixed detection electrodes disposed on a third portion of said support substrate orthogonal to said first and second portions of said support substrate, said first movable detection electrode and said first plurality of fixed detection electrodes being arranged with respect to each other to form a first detection condenser.

16. An angular velocity sensor according to claim 15, wherein said detection means comprises at least one second movable detection electrode on a fourth portion of said inner framelike vibrator spaced from and opposite to said first and third portion and a second plurality of fixed detection electrodes disposed on a fourth portion of said support substrate spaced from and opposite to said third portion of said support substrate, said second movable detection electrode and said second plurality of fixed detection electrodes being arranged with respect to each other to form a second detection condenser.

17. An angular velocity sensor according to claim 16, wherein each of said first and second pluralities of fixed driving electrodes has a comb-like configuration and each of said first and second pluralities of movable driving electrodes has a comb-like configuration.

18. An angular velocity sensor according to claim 17, comprising a third plurality of movable driving electrodes connected to a first portion of said outer framelike vibrator and a third plurality of movable driving electrodes connected to a second portion of said outer framelike vibrator spaced from and opposite to said first portion, and third and fourth pluralities of fixed driving electrodes connected to said support substrate at spaced locations, said third and fourth pluralities of movable driving electrodes being arranged with respect to said third and fourth pluralities of fixed driving electrodes, respectively, such that when said voltage is applied between said third and fourth pluralities of movable driving electrodes and said third and fourth pluralities of fixed driving electrodes, a driving force is applied to said outer framelike vibrator to cause displacement of said inner and outer framelike vibrators in the second direction.

* * * * *